United States Patent

[11] 3,534,701

[72] Inventor: Maurice E. Hebert, Ste-Foy, Quebec, Canada
[21] Appl. No.: 763,265
[22] Filed: Sept. 27, 1968
[45] Patented: Oct. 20, 1970
[73] Assignee: By mesne assignments, to Nanuk Inc., Quebec, Canada, a corporation

[54] AMPHIBIOUS SNOW VEHICLE
17 Claims, 12 Drawing Figs.

[52] U.S. Cl. .................................................. 115/1
[51] Int. Cl. .................................................. B60f 3/00
[50] Field of Search .................................................. 115/1

[56] References Cited
UNITED STATES PATENTS
3,474,751  10/1969  Hebert .................................... 115/1

*Primary Examiner* — Andrew H. Farrell
*Attorney* — Cushman, Darby and Cushman

ABSTRACT: An amphibious snow vehicle having a buoyant body supported on an endless track assembly for propelling the vehicle on land and impeller wheels associated with the endless track drive mechanism for propelling the vehicle on a body of water.

INVENTOR
MAURICE E. HEBERT
BY Cushman, Darby & Cushman
ATTORNEYS

Patented Oct. 20, 1970

INVENTOR
MAURICE E. HEBERT
BY Cushman, Darby & Cushman
ATTORNEYS

AMPHIBIOUS SNOW VEHICLE

The present invention relates to a motor vehicle and more specifically to a small amphibious snowmobile.

The majority of prior art vehicles of the miniature type, such as the two passenger snowmobiles, are propelled by a single endless track and steered by skis provided at the front of the vehicle. A disadvantage of this type of vehicle is that it is difficult to control, this being due to the fact that it is steered by skis and that the snow conditions will affect the control of the skis. For example, if the snow is hard packed and icy, it will be very difficult to steer the vehicle as the skis will merely slide on the surface of the snow. Also, if a sudden sharp turn has to be suddenly executed, this type of vehicle will have a tendency to turn over because of its high centre of gravity. When this type of vehicle is occupied by a few passengers the majority of the passenger weight is to the rear portion of the vehicle, where the seat is located, and the skis will not have much control on the snow for the reason that the weight is mainly over the endless track. A further disadvantage is that these vehicles are designed for use during the winter season and are restricted for travel over snow although some adaptations have been provided for the use of the vehicle over water but when adapted thus, the vehicle is restricted for use on water only.

Of the amphibious type vehicles known, the majority of these have been equipped with a screw propeller for propelling the vehicle through water and have not been suitable for use on deep snow or swampy terrain. Also, some of these vehicles are restricted for travel on terrain which is substantially free of obstacles such as dead logs, rocks, mud, etc. Of the class of amphibious vehicles supported on two tracks, the majority of these are large vehicles used for transporting heavy equipment and a large number of people. Because of their large size and of their heavy load these vehicles cannot operate in a heavily bushed terrain and deep soft snow.

It is an object of the present invention to provide a snowmobile which will substantially overcome the above-mentioned disadvantages and which will operate on land and on water.

According to one broad aspect, the present invention relates to a vehicle comprising a buoyant body and an endless track on the underside of said body supported between a traction train and a rear idle train assembly to propel said vehicle on land, said traction train assembly having a track engaging drive sprocket wheel rigidly secured to a driven axle, the improvement comprising said endless track coacting with one or more centrifugal pumping wheels secured to said driven axle, a portion of said pumping wheels supportingly engaging the endless track for generating a propelling thrust to said vehicle when operated on water.

The invention is illustrated, by way of example, in the accompanying drawing in which:

FIG. 12 is a side view, partly in section, of a portion of the front of the vehicle showing the impeller wheel.

Figure 1:
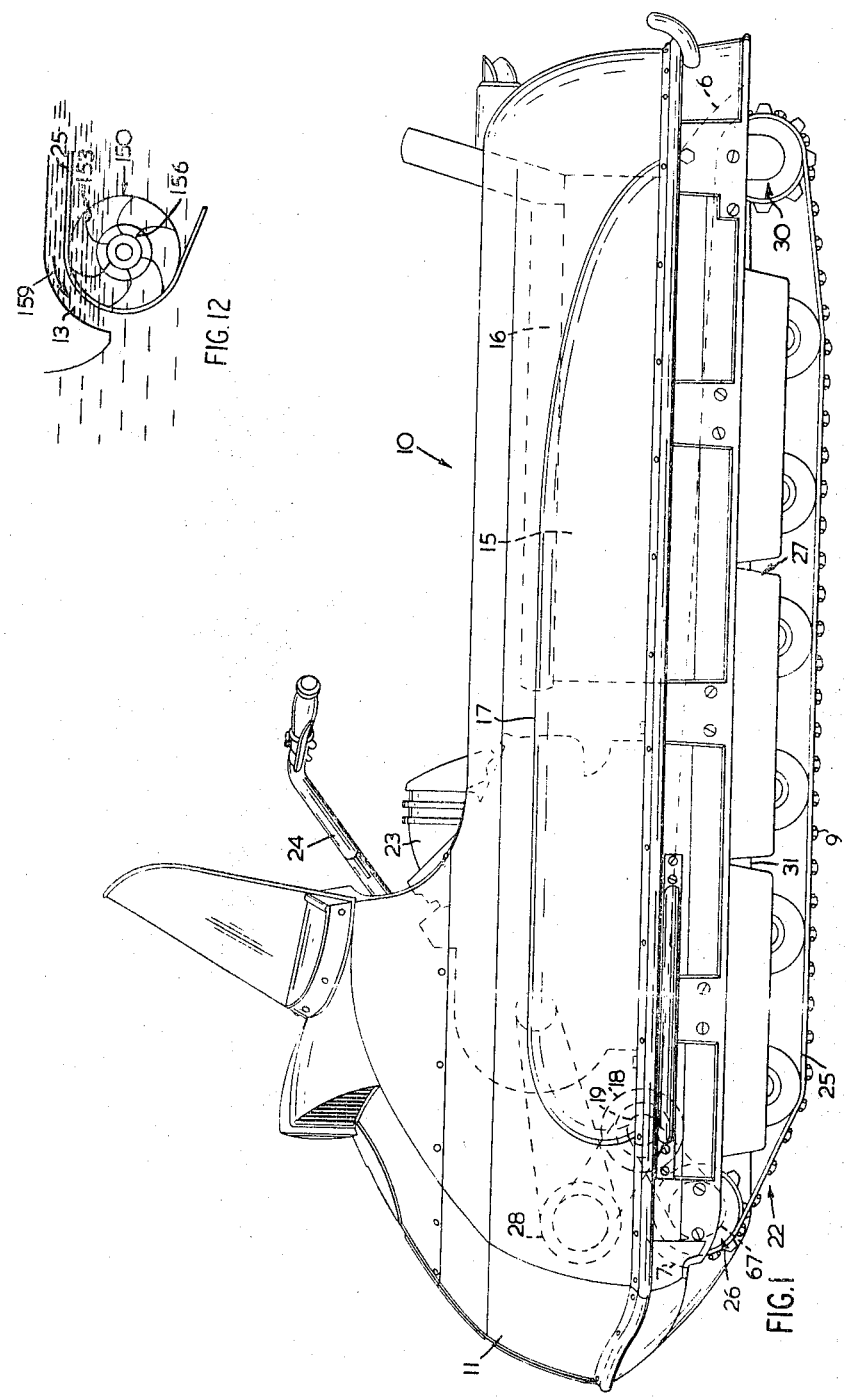
FIG. 1 is a side view of the amphibious snow vehicle of the present invention.
Figure 2:
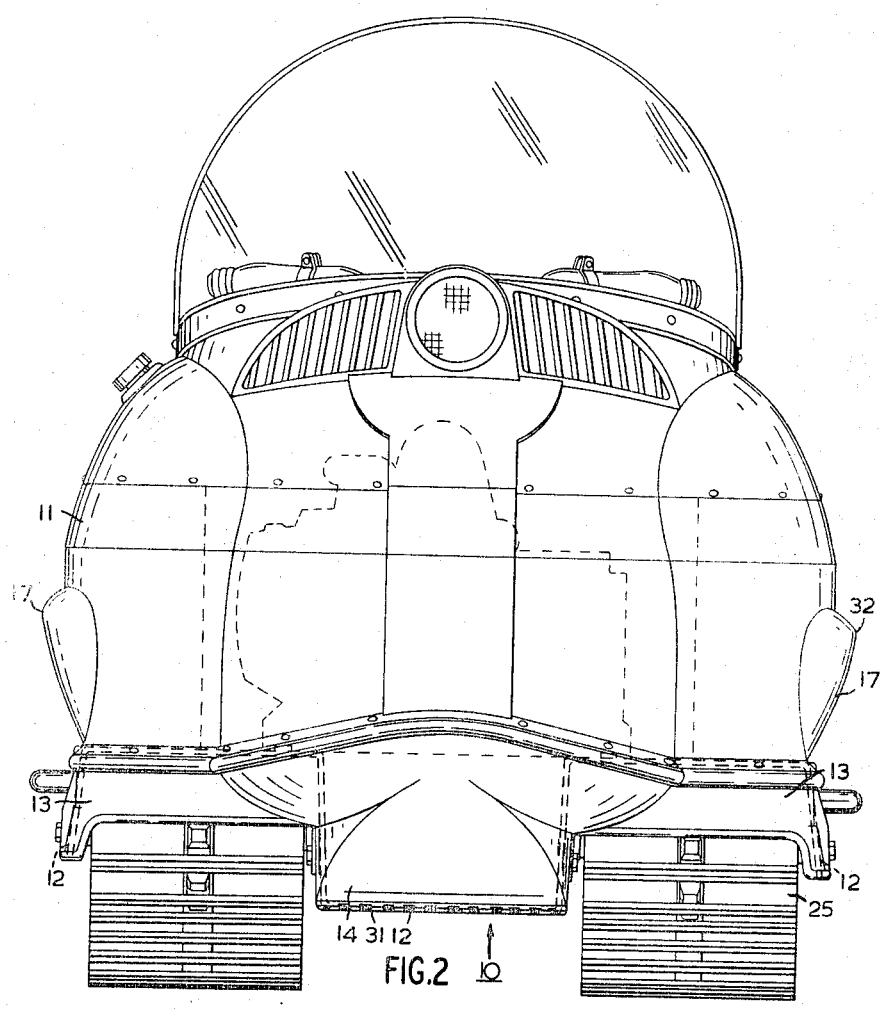
FIG. 2 is a front view of the snow vehicle as shown in FIG. 1.

Referring to the drawings and more specifically to FIGS. 1 and 2 there is shown an amphibious snow vehicle generally indicated at 10. The vehicle consists of a body 11 secured to a frame 12, the body and frame preferably but not exclusively constructed of glass fibre material. The cross section of the frame 12 is illustrated by the heavy dotted lines in FIG. 2. The frame 12 defines two longitudinal cavities 13 of substantially rectangular cross section and which extend parallel to the longitudinal axis of the body of the vehicle and on both sides thereof. A track assembly 22 is supported in each cavity and protrudes therefrom to support the vehicle off the ground. Between the cavities 13, the frame 12 defines a central portion 14 of substantially rectangular cross section and which protrudes below the cavities at the front of the vehicle and tapers off to the rear of the vehicle to a point which is in the same plane as the opening of the cavities (see surface 31, FIG. 1). The forward part of the central portion 14 is curved upwardly such that the surface 31 of the central portion resembles the configuration of a boat hull. The interior of the central portion 14 contains a gas tank and a storage compartment 15 located under a passenger's seat 16. On each side of the body 11 there is formed integral therewith an elongated embossed section 17, extending longitudinally to the body 11 and defining a bulbous portion 32 in the upper part thereof to further add to the buoyancy and stability of the vehicle when operating on water.

In the front portion of the vehicle there is provided an engine 23 for driving the endless tracks 25. The engine is coupled to the traction train 26 via a differential assembly, generally indicated at 28, which forms part of the steering mechanism and which is described in detail in applicant's copending Canadian application Ser. No. 006,329, filed Nov. 29, 1967. In the arrangement shown in FIG. 1, the differential assembly 28 is coupled to a second differential assembly 18 comprising a pair of variable diameter pulleys (not shown) secured to an axle. The drive of the second differential assembly 18 is coupled to the traction train 26 by means of chain sprocket wheels 19 and 67 secured to the axle of the second differential assembly 18 and the axle of the traction train 26 respectively. To remove tension from the steering assembly, a suitable reduction ratio may be provided between both chain sprocket wheels 19 and 67.

As shown in FIG. 1 a track assembly generally indicated at 22 is provided in each cavity 13. The front of each cavity 13 is curved, as indicated by numeral 7, such that any water which may be ejected in the front of the cavity, due to the counter-clockwise rotation of the endless track when the vehicle is in movement on a body of water, will be thrown downwardly and develop a slight upward thrust. To decrease any resistance with the flow of water through the cavities 13, the rear portion 6 of the cavities taper downwardly and angularly rearwardly behind the rear train assembly. For operation on water, the vehicle is propelled by impeller wheels 150, which will be described later in detail. The impeller wheels 150 are secured to the drive shaft of the traction train 26 and provide a centrifugal pumping action which develops a sufficient propelling thrust to displace the vehicle on water.

Figure 9:
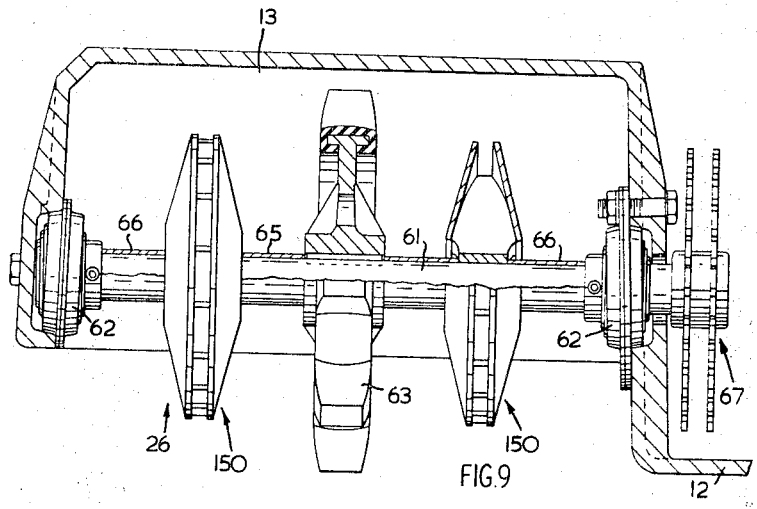
FIG. 9 is a front view partly in section, of the traction train assembly.

Although FIG. 9 shows two impeller wheels, only one of these may be provided on one side of the sprocket wheel, and the other side of the sprocket would contain a track supporting wheel as described in my above-mentioned copending application.

Figure 3:
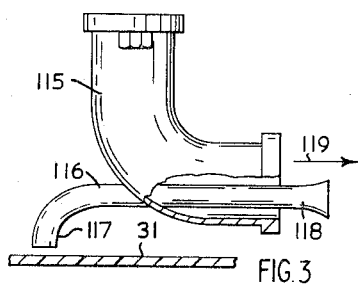
FIG. 3 is a side view partly in section of a section of the exhaust system.

Referring to FIG. 3 there is shown a water pumping system for removing any water that may enter the vehicle. Herein shown a syphon tube 116 is disposed in a portion of the exhaust pipe 115 and protrudes therefrom, so that its end 117 lies close to the floor of the central portion 14 to pump out any water that may accumulate therein. As the burned gases from the engine are forced through the exhaust pipe 115 in the direction of arrow 119, a vacuum is created at the end 118 of the syphon tube 116 thus causing a suction in the tube and drawing any water, that may be present adjacent the end 117, through the tube 116 and into the exhaust system (not shown). To prevent any water from entering into the exhaust system via the exhaust port, when the engine is not operating, a check valve (not shown) is located in the exhaust port.

Figure 4:
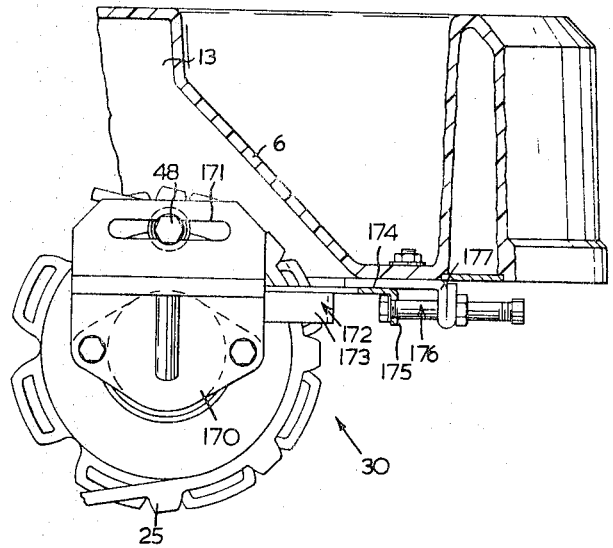
FIG. 4 is a side view, partly in section, of the rear train assembly.
Figure 5:
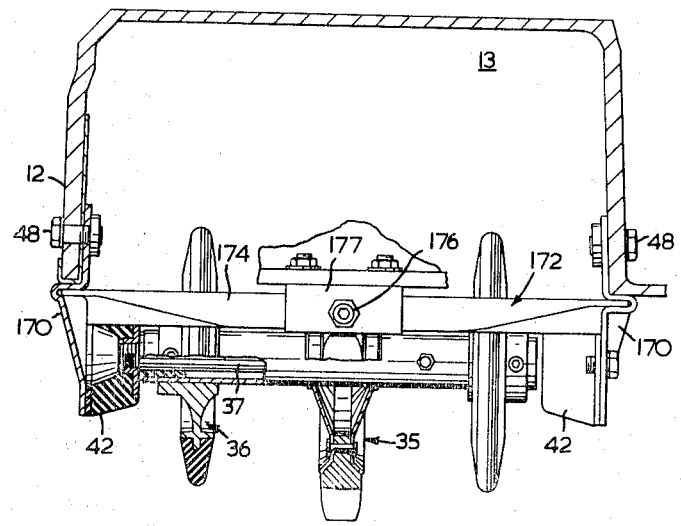
FIG. 5 is a front view, partly in section, of the rear train assembly shown in FIG. 4.

Referring to FIGS. 4 and 5 there is shown a rear train assembly 30. Herein shown a rear axle 37 is disposed transversely to the longitudinal axis of its associated cavity 13 and supported intermediate a pair of arms 170, each arm 170 being slideably connected in its upper portion to the frame 12 by means of a bolt 48 cooperating with slot 171 disposed horizontally in said upper portion of the arm 170. To adjust the tension in the endless track 25, each pair of arms 170 is selectively displaced along the horizontal axis of the cavity, this limited distance being determined by the length of the slot 171. To displace each pair of arms 170 simultaneously and to maintain them in alignment, both said arms 170 are connected together by a connecting bracket 172 of generally U-shaped configuration, the connecting bracket 172 comprises two side arms 173 fixedly secured, in the forward portion thereof to a respective arm 170 of a pair of said arms 170, and interconnected in their rear portion by a transverse piece 174 having an extension 175 at the end thereof projecting downwardly and normal to the longitudinal axis of the side arms 173. To selectively adjust the arms 170, an adjusting bolt 176 is threadably connected to a fixed bracket 177 and is secured at one of its ends to the extension 175 so that by threading or unthreading the bolt 176 in the fixed bracket 177, the arm 170 will be displaced horizontally within its limited range determined by the length of slot 171.

Figure 6:
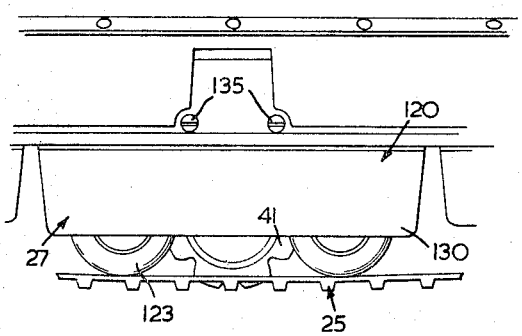
FIG. 6 is a side view of a buoyant type truck assembly.
Figure 7:
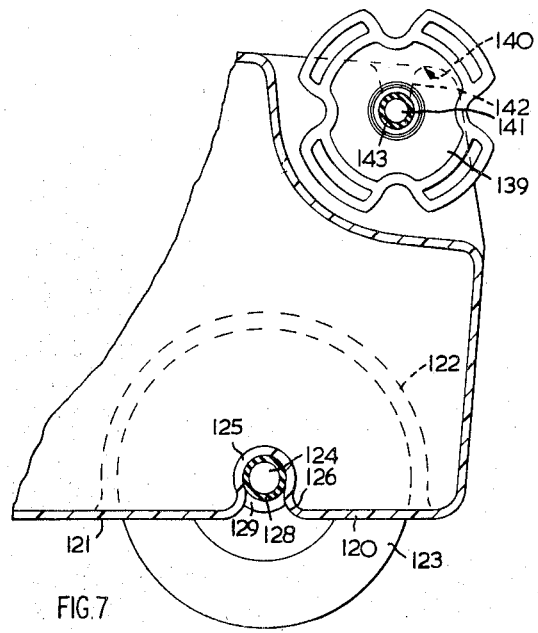
FIG. 7 is a side view, partly in section, of a fragmented portion of a flotation casing.
Figure 8:
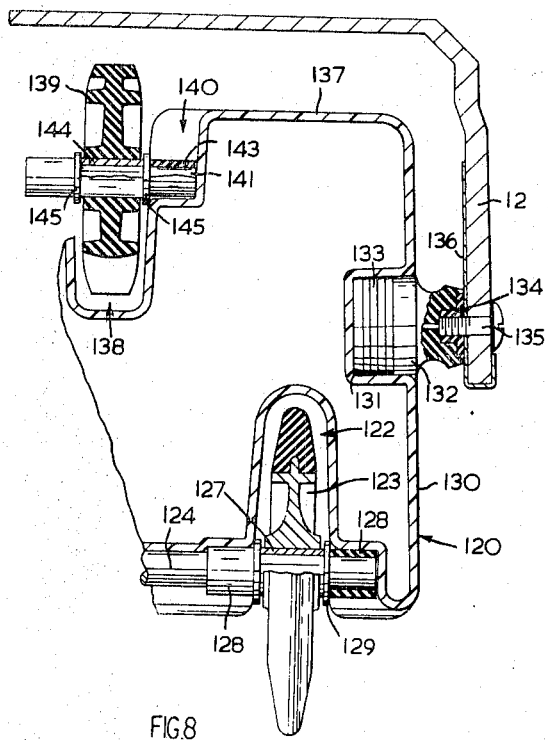
FIG. 8 is a front view, partly fragmented, of a portion of a flotation casing and supporting assembly.

Referring to FIGS. 6, 7 and 8, there is shown the truck assembly 27. The truck assembly consists of one or more hollow flotation casings 120 of substantially rectangular configuration, with the exception of the front casing 120 (not shown) in each cavity which is preferably streamlined in its front portion to reduce the resistance with the flow of water under the vehicle. The flotation casings herein shown are molded from rigid thermoplastic material. On opposite side surfaces 130, of each casing 120, there is provided a pair of circular recesses 131 of selected diameter for receiving a respective supporting rubber mount 132. The free end portion of the supporting rubber mount 132 engaging in the recess 131 is provided with a plurality of circumferential ridges 133, each of the ridges 133 sloping downwardly away from the secured end of the mount 132 so that when the free end portion is inserted in the recess 131 a vacuum is created in the recess which prevents the free end from disengaging therewith. The fixed end portion of each mount 132 is provided with a lug 134 embedded therein and adapted to receive a bolt 135 passing through the frame 12 for securing the mount 132 thereto.

With this arrangement it can be seen that when the vehicle is travelling over rough terrain, the casings 120 will absorb some of the shocks for the reason that the rubber mounts 132 will be flexed when the casing is subjected to an upward push when the endless track 25 passes over obstacles.

As can be seen from FIG. 8, the lower edge of the frame 12, defining the outer side of each cavity is reinforced throughout with an aluminum strip 136 shaped to the contour of the lower edge and secured thereto by the bolts 135.

In the lower surface 121 of each flotation casing 120, there is provided four wheel receiving cavities 122, one substantially in each corner of the flotation casing 120, to receive a portion of a supporting wheel 123 therein and to permit free rotation thereof. Each pair of adjacent wheels 123 is secured on a respective axle 124 which is held in the lower surface 121 of the casing 120, transversely to the longitudinal axis of the cavity 13. The axle 124 is held in an elongated recess 125 which is disposed normal to the longitudinal axis of the casing 120 and in its lower surface 121, and aligned with the centre of the diameter of adjacent wheel receiving cavities 122 at a respective end of the casing 120. The elongated recess 125 is of substantially U-shaped cross section, the sides of the U-configuration tapering slightly inwardly towards each other, and curvilinearly outwardly to the lower surface 121 of the casing 120, to define a boss 126 in the sides of the recess 125 to retain the axle 124 therein. The wheels 123 are mounted on a respective oiled bearing 127 and held in a fixed position, at their respective end of the axle 124, by means of a rubber bushing 128 and washer 129 located on each side of the wheel 123 and bearing 127 and abutting against the lower portion of the sides of the cavity 122. The portion of the elongated recess 125 receiving the rubber bushings 128, is slightly larger than the portion receiving the axle 124. To secure the wheels 124 in position, the axle assembly is merely snapped in position in the elongate recess 125.

Centrally located in the upper surface 137 of the flotation casing 121, is a wheel receiving cavity 138 for retaining a track supporting idler sprocket wheel 139. The cavity 138 is of substantially U-shaped cross section and defines a recess 140 in each side thereof and disposed adjacent each other to support an axle 141 horizontally and parallel to axles 124. The recesses 140 are substantially U-shaped and define a boss 142 in the upper end of its respective side faces to retain the axle 141 fitted with a rubber bushing 143 about each end. The track supporting idler sprocket wheel 139 is mounted on an oilite bearing 144 held in position, in the cavity 138, by a washer 145 disposed on each side thereof and abutting against the walls of the U-shaped cavity 138. To position the track supporting idler sprocket wheel assembly, the ends of the axle 141, fitted with a respective bushing 143, are snapped in position in their respective recess 140. Although, herein described a track supporting idler wheel assembly is provided in the upper surface 137 of the flotation casing 121, this assembly may not be necessary and the tracks may be supported, in its upper travel, on the flat upper surface 137 of the casing 121.

As shown in FIG. 6 a guide sprocket wheel 41 may be provided in the lower surface of the flotation casing 120 and centrally positioned therein in a cavity and secured to the casing in a similar manner as that described hereinabove for wheels 123. The sprocket wheel 41 extends from the lower surface 121 of the casing 120 and engages with the centre of the endless track 25 to prevent lateral displacement of the track 25 when the vehicle executes a turn or is driven over rough terrain. The idle sprocket wheel 41 may be provided only in the middle truck 27 of the complete endless track assembly.

Referring now to FIG. 9 there is shown the traction train assembly 26 for driving the endless tracks 25 (see FIG. 1). Although FIG. 9 only shows one traction train assembly, identical assemblies are provided on both sides of the vehicle. The traction train assembly, generally indicated at 26, comprises a shaft 61 supported in the front portion of the cavity 13 and transversely to the longitudinal axis of the vehicle, and extending a limited distance inside the central portion 14 of the frame 12. The shaft 61 is supported by bearings 62 which provides limited axial displacement of the shaft 61. The bearings 62 also prevent leakage between the cavity 13 and the central portion 14 when the vehicle is used on water. To drive the endless track a sprocket wheel 63 is rigidly secured to the shaft 61 and located at the centre of the width of the cavity 13. The endless track is supported laterally by impeller wheels 150, the main purpose of which will be described later, positioned on each side of the sprocket wheel 63 and spaced equidistant from the sprocket wheel 63 by an inner and outer spacer member 65 and 66 respectively, on the shaft 61.

The portion of the shaft 61 which extends in the central portion 14 of the frame 12, is provided with a chain sprocket wheel 67.

Figure 10:
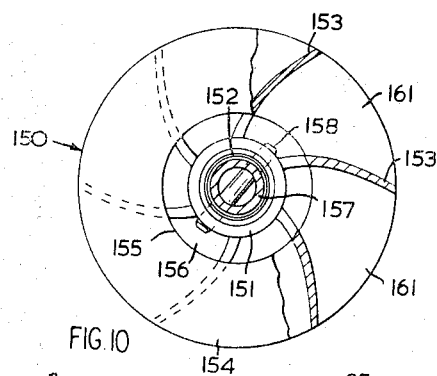
FIG. 10 is a fragmented side view of an impeller wheel.
Figure 11:
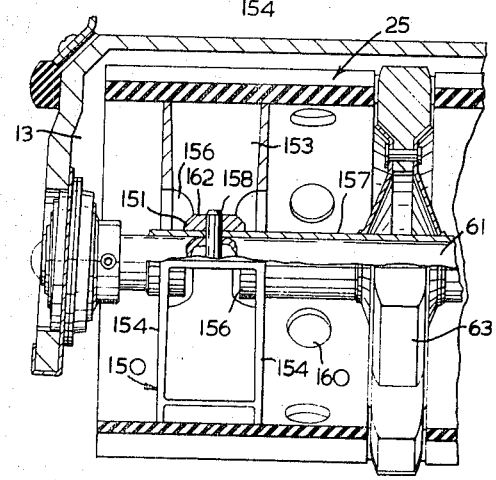
FIG. 11 is a front view, partly fragmented, of a portion of a traction train assembly.

As shown in FIG. 10 and 11, each impeller wheel 150 comprises a circular hub portion 151 having a central bore 152 therein and a plurality of arcuately extending vanes 153 equidistantly spaced about the cylindrical surface 162 of the hub and disposed between a pair of circular side plates 154 centrally secured on a respective side of the hub portion 151 and lying substantially parallel to each other, although in FIG. 9 these are shown inclined inwardly and for a specific reason as will be described later. Each vane 153 extends transversely across the peripheral surface 162 of the hub portion and outwardly to the outer periphery of the circular side plates 154.

The side plates 154 are each provided with an aperture 155 near its centre, the aperture 155 being slightly larger in diameter than the hub portion 151. The edges of the vanes 153 extend from the ends of the cylindrical surface 162 of the hub portion and converge curvilinearly outwardly to the periphery of a respective aperture 155 thus defining an inlet port 156, on each side of the impeller wheel 150, to the passages 161 defined between adjacent ones of said vanes 153.

As can be seen from reference to FIG. 11, the impeller 150 is secured over a sleeve 157 fitted about the shaft 61, by means of a tension pin 158 disposed in a bore provided across the hub portion 151, the sleeve 157 and the shaft 61.

The thrust provided by the impeller 150 is derived from the centrifugal pumping action caused by the rotation of the impeller in a counterclockwise direction, as indicated by arrow 159 in FIG. 12. It can be seen from FIG. 12 that when the vehicle is operating on a body of water, the impeller wheel 150 is substantially completely submerged in water in insure that water is everpresent at the inlet port 156. When the endless tracks are in movement, to cause forward displacement of the vehicle, the impellers 150 rotate and the water present at the inlet ports 156 is drawn into the impeller passages 161, by the centrifugal action created by the rotating vanes 153, and is thrown outwardly towards the outer end of the passages 161. Because the endless track 25 passes about a portion of the impeller wheels 150 (see FIG. 12) the water thrown outwardly in the passages 161 cannot escape because the endless track covers the opening at the outer end of these passages and the result is that this water is discharged rearwardly of the impeller wheels at a velocity dependent upon the speed of rotation of the impeller wheels. This rearward discharge imparts a forward thrust to the vehicle which is sufficient to adequately displace the vehicle on water.

Although the side plates 154 are shown lying substantially parallel to each other, these may be inclined slightly inwardly, as shown in FIG. 13, to reduce the surface area of the opening at the outer end of the passages thereby increasing the pressure of the water being ejected therethrough by the centrifugal action created by the rotating impeller wheel.

In operation, the vehicle is displaced on land by the endless tracks 25 and steered by the steering assembly 24 associated with the differential assembly 28. For a complete description of the steering mechanism, reference is made to applicant's aforementioned copending application.

The propelling of the snowmobile on a body of water is effected by the impeller wheels and the steering of the vehicle is being effected in the same manner as on land, that is, by the steering mechanism. By displacing the steering arms to the right or to the left the speed of the drive shafts of the traction train in the respective cavities are varied inversely one with respect to the other and the thrust generated by the impeller wheels associated with these drive shafts will increase on one side of the vehicle and decrease on the opposite side thereby causing the vehicle to execute a turn. As mentioned hereinabove, the thrust developed by the centrifugal pumping action of the impeller wheels is sufficient to adequately displace the vehicle. However, if it is desirable to obtain further propulsion and consequently higher vehicle speeds when operating on water, the impeller wheels may be rotated at a higher velocity that the velocity as when used on land. In order to obtain this increase in the drive speed an arrangement (not shown) may be provided whereby the drive ratio can be increased simply operating a control which would cause engagement of another sprocket ratio.

I claim:

1. In a vehicle having a buoyant body and an endless track on the underside of said body supported between a traction train and a rear idle train assembly to propel said vehicle on land, said traction train assembly having a track engaging drive sprocket wheel rigidly secured to a driven axle the improvement comprising said endless track coacting with one or more centrifugal pumping wheels secured to said driven axle, a portion of said pumping wheels supportingly engaging the endless track for generating a propelling thrust to said vehicle when operated on water.

2. A vehicle as claimed in claim 1 wherein said centrifugal pumping wheels are impeller wheels.

3. A vehicle as claimed in claim 2 wherein said impeller wheels or wheels comprise a bored hub portion having a plurality of arcuate vanes extending therefrom and two circular side plates centrally positioned with respect of said hub portion and secured on a respective side of said hub portion, and an aperture near the centre of each said side plates to provide an inlet port to the passages between said vanes.

4. A vehicle as claimed in claim 3 wherein said vanes are disposed transversely across the outer surface of said hub portion.

5. A vehicle as claimed in claim 3 wherein the said vanes extend from the outer surface of said hub portion and converge curvilinearly outwardly to the outer periphery of said plates.

6. A vehicle as claimed in claim 3 wherein two impeller wheels are secured to said driven axle and positioned on a respective side of said track engaging drive sprocket wheel which is secured at the centre of said driven axle.

7. A vehicle as claimed in claim 3 wherein said impeller wheel is secured to said driven axle by a tension pin positioned in a bore diametrically disposed across said hub portion and said driven axle.

8. A vehicle as claimed in claim 3 wherein said side plates are parallel to each other.

9. In a vehicle having a buoyant body, a pair of elongated cavities in the underside of said body disposed parallel to the fore/aft axis of said vehicle, an endless track supported in each said cavities between a traction train and a rear idle train assembly to propel said vehicle on land, said traction train having a track engaging drive sprocket wheel rigidly secured to a driven axle, the improvement comprising each said endless tracks coating with one or more centrifugal pumping wheels secured to said driven axle, a portion of said pumping wheels supportingly engaging the endless track for generating a propelling thrust to said vehicle when operated on water.

10. A vehicle as claimed in claim 9 wherein said centrifugal pumping wheels are impeller wheels.

11. A vehicle as claimed in claim 10 wherein said impeller wheel or wheels comprise a bored hub portion having a plurality of arcuate vanes extending therefrom and two circular side plates centrally positioned with respect to said hub portion and secured on a respective side of said hub portion, and an aperture near the centre of each said side plates to provide an inlet port to the passages between said vanes.

12. A vehicle as claimed in claim 11 wherein said vanes are disposed transversely across the outer surface of said hub portion.

13. A vehicle as claimed in claim 11 wherein the said vanes extend from the outer surface of said hub portion and converge curvilinearly outwardly to the outer periphery of said side plates.

14. A vehicle as claimed in claim 11 wherein two impeller wheels are secured to said driven axle and positioned on a respective side of said track engaging drive sprocket wheel which is secured at the centre of said driven axle.

15. A vehicle as claimed in claim 11 wherein said impeller wheel or wheels are secured to said driven axle by a tension pin positioned in a bore diametrically disposed across said hub portion and said driven axle.

16. A vehicle as claimed in claim 11 wherein said side plates are parallel to each other.

17. A vehicle as claimed in claim 9 wherein said centrifugal pumping wheels are impeller wheels each having a bored hub portion, a plurality of arcuate vanes extending from said hub portion and two circular side plates centrally positioned with respect of said hub and secured on a respective side thereof, an aperture near the centre of each said side plates to provide an inlet port to passages between said vanes so that when said impeller wheel is rotated in water, the water will be drawn into said passages through said apertures and be ejected outwardly at the outer periphery of said wheel, said endless track supportingly engaged by a portion of said wheel preventing ejection of water in this portion of said wheel to thereby provide ejection of water only in a general rearward direction of said vehicle.